United States Patent
Eastman

(10) Patent No.: US 11,293,866 B2
(45) Date of Patent: Apr. 5, 2022

(54) FIBER OPTIC ANALYTE SENSOR

(76) Inventor: John Eastman, Rogers, MN (US)

( * ) Notice: Subject to any disclaimer, the term of this patent is extended or adjusted under 35 U.S.C. 154(b) by 1251 days.

(21) Appl. No.: 13/426,831

(22) Filed: Mar. 22, 2012

(65) Prior Publication Data

US 2013/0251593 A1    Sep. 26, 2013

(51) Int. Cl.
| G01N 21/64 | (2006.01) |
| G01N 21/77 | (2006.01) |
| G01N 21/78 | (2006.01) |

(52) U.S. Cl.
CPC ....... *G01N 21/643* (2013.01); *G01N 21/7703* (2013.01); *G01N 21/783* (2013.01)

(58) Field of Classification Search
None
See application file for complete search history.

(56) References Cited

U.S. PATENT DOCUMENTS

| 4,622,974 | A | 11/1986 | Coleman et al. |
| 5,173,432 | A | 12/1992 | Lefkowitz et al. |
| 5,190,729 | A | 3/1993 | Hauenstein |
| 5,230,427 | A | 7/1993 | Betts et al. |
| 8,173,438 | B1 | 5/2012 | Putnam et al. |
| 8,694,069 | B1 | 4/2014 | Kosa |
| 9,057,687 | B2 | 6/2015 | Eastman |
| 9,316,554 | B1 | 4/2016 | Eastman et al. |
| 9,568,400 | B2 | 2/2017 | Dykes, Jr. |
| 2003/0221477 | A1 | 12/2003 | Pierskalla et al. |
| 2003/0235513 | A1 | 12/2003 | Asai et al. |
| 2005/0113658 | A1 | 5/2005 | Jacobson et al. |
| 2006/0144811 | A1 | 7/2006 | Cheng |
| 2006/0200183 | A1 | 9/2006 | Schoen et al. |
| 2007/0227270 | A1 | 10/2007 | Menenga et al. |
| 2007/0243618 | A1 | 10/2007 | Hatchett et al. |
| 2008/0072992 | A1 | 3/2008 | Baleriaux et al. |
| 2008/0146902 | A1 | 6/2008 | Hacker et al. |
| 2009/0075321 | A1* | 3/2009 | Obeid et al. ................. 435/29 |
| 2009/0084156 | A1 | 3/2009 | Matsuda et al. |
| 2009/0326344 | A1 | 12/2009 | Meyer |
| 2010/0116017 | A1 | 5/2010 | Mayer et al. |
| 2010/0173046 | A1 | 7/2010 | Lisa |
| 2011/0223678 | A1 | 9/2011 | Ascheman et al. |
| 2012/0129268 | A1 | 5/2012 | Mayer |

(Continued)

FOREIGN PATENT DOCUMENTS

| CA | 2600563 A1 | 6/2006 |
| DE | 102005024578 A1 | 11/2006 |

(Continued)

OTHER PUBLICATIONS

Multisorb Technologies, FRESHPAX, Oxygen Absorbing Packets and Strips, 2009.

(Continued)

*Primary Examiner* — Neil N Turk
(74) *Attorney, Agent, or Firm* — Sherrill Law Offices, PLLC

(57) ABSTRACT

A fiber optic analyte sensing needle 10 with a photoluminescent analyte-sensitive probe 70 nonadherently entrapped within the lumen 29 of the needle 20 between the distal tip 51 of a fiber optic filament 50 and the distal tip 21 of the needle 20. The probe 70 has unimpeded fluid communication with the external environment through a port 28 in the needle 20.

5 Claims, 4 Drawing Sheets

(56) References Cited

U.S. PATENT DOCUMENTS

2013/0251593 A1  10/2013  Eastman
2013/0276508 A1  10/2013  Eastman

FOREIGN PATENT DOCUMENTS

| EP | 1887344 A1 | 2/2008 |
|----|------------|--------|
| EP | 2336753 A2 | 6/2011 |
| EP | 2642278 A2 | 9/2013 |
| WO | 1992019150 A1 | 11/1992 |
| WO | 20110114320 A1 | 9/2011 |
| WO | 20140152194 A1 | 9/2014 |

OTHER PUBLICATIONS

Papkovsky, Dmitri et al., "Biosensors on the basis of luminescent oxygen sensor: the use of microporous light-scattering support materials", Biochemestry Department, National University of Ireland, Cork, Elsevier, 1998. pp. 137-145.

\* cited by examiner

FIBER OPTIC ANALYTE SENSOR

BACKGROUND

Photoluminescent sensors or probes are a widely employed method of measuring analyte concentration, typically oxygen, within a defined space, typically an enclosed space such as the headspace of a package or container. See, for example United States Published Patent Applications 2009/0029402, 2008/8242870, 2008/215254, 2008/199360, 2008/190172, 2008/148817, 2008/146460, 2008/117418, 2008/0051646, and 2006/0002822, and U.S. Pat. Nos. 7,569,395, 7,534,615, 7,368,153, 7,138,270, 6,689,438, 5,718,842, 4,810,655, and 4,476,870.

Briefly, analyte concentration within a package or container can be measured by placing an analyte-sensitive photoluminescent probe within the package or container, allowing the probe to equilibrate within the package or container, exciting the probe with radiant energy, and measuring the extent to which radiant energy emitted by the excited probe is quenched by the presence of the target analyte. Such optical sensors are available from a number of suppliers, including PreSens Precision Sensing, GmbH of Regensburg, Germany, Oxysense of Dallas, Tex., United States, and Luxcel Biosciences, Ltd of Cork, Ireland.

In order to permit impromptu testing of a defined space, the photoluminescent probe can be provided as a coating on the distal tip of a fiber optic filament which is threaded into the lumen of a needle and protectively retained in a fixed position within the lumen by a target analyte permeable encapsulant. One example of such a fiber optic sensing needle for use in measuring the concentration of oxygen within living tissue is described in United States Patent Application Publication US 2009/0075321, the entire disclosure of which is hereby incorporated by reference.

While fiber optic sensing needles, such as that described in US 2009/0075321, are effective for impromptu measurement of analyte concentration within a defined space, they are difficult to assemble and slow to respond after being placed into fluid communication with a defined space to be tested.

Hence, a need exists for a fast response fiber optic sensing needle that is easy to assemble.

SUMMARY OF THE INVENTION

The invention is a fiber optic analyte sensing needle. The sensing needle includes a needle, at least one fiber optic filament and a photoluminescent analyte-sensitive probe. The needle has a longitudinal lumen with at least one lateral side port proximate the distal tip. The at least one fiber optic filament has a distal end portion sealingly jacketed within the lumen of the needle. The photoluminescent analyte-sensitive probe is nonadherently entrapped within the lumen between the distal tip of the at least one fiber optic filament and the distal tip of the needle. The probe has unimpeded fluid communication with the external environment through the at least one lateral side port in the needle.

DETAILED DESCRIPTION OF A PREFERRED EMBODIMENT

Nomenclature

10 Fiber Optic Analyte Sensing Needle
20 Needle
21 Distal Tip of Needle
28 Ports in Needle
29 Lumen of Needle
30 Collar
40 Leur Lock Style Fitting
50 Fiber Optic Filament
51 Distal Tip of Fiber Optic Filament
60 Sealant
70 Photoluminescent Analyte-Sensitive Probe
71 Carrier Substrate
72 Polymer Matrix
73 Photoluminescent Analyte-Sensitive Dye

Description

Construction

Figure 1:
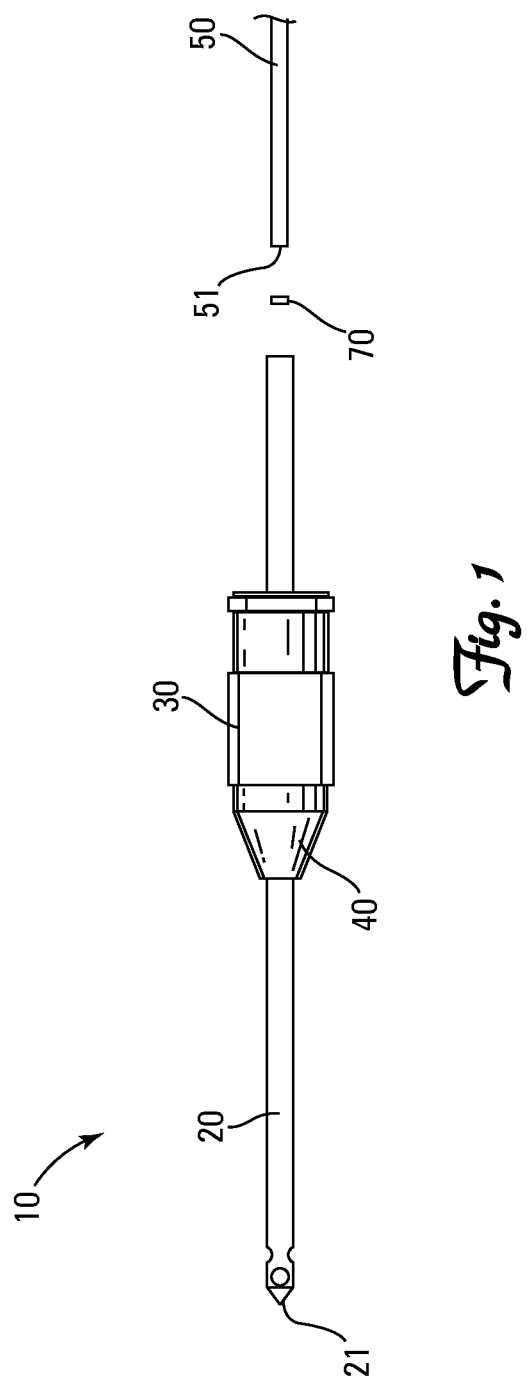
FIG. 1 is an exploded side view of one embodiment of the invention.

Referring generally to FIG. 1, the invention is a fiber optic analyte sensing needle 10. The sensing needle 10 includes a needle 20, at least one fiber optic filament 50 and a photoluminescent analyte-sensitive probe 70.

Figure 2A:
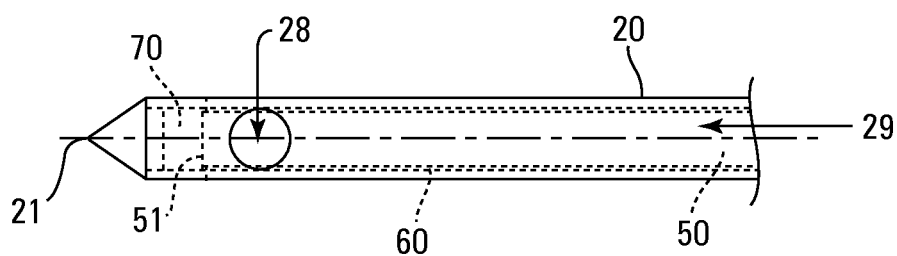
FIG. 2A is an enlarged side view of the distal end portion of the assemble invention depicted in FIG. 1.
Figure 2B:
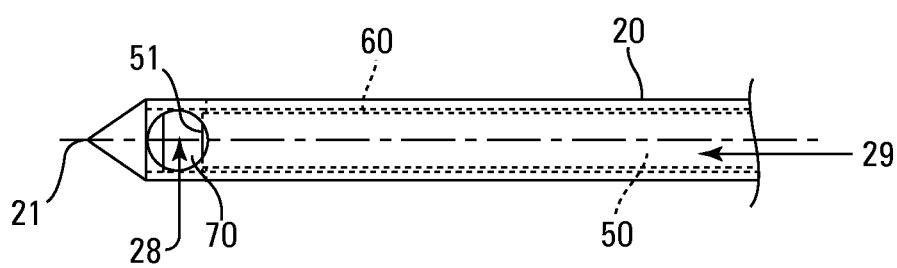
FIG. 2B is a top view of the distal end portion of the assemble invention depicted in FIG. 2A.

Referring generally to FIGS. 2A and 2B, the needle 20 has a longitudinal lumen 29 with at least one port 28 proximate the distal tip 21 of the needle 20. The port 28 is preferably a lateral side port 28, most preferably at least two diametrically opposed lateral side ports 28.

The needle 20 is preferably attached to a collar 30 via a Luer taper fitting 40, such as a Luer-Lok or Luer-Slip fitting.

The at least one fiber optic filament 50 has a distal end portion sealingly jacketed within the lumen 29 of the needle 20. The fiber optic filament 50 is preferably sealingly adhered to the inner wall (not separately numbered) of the needle 20 by a suitable target-analyte impermeable sealant 60, such as an epoxy, to secure the at least one fiber optic filament 50 within the lumen 29 and prevent target-analyte located outside a container or package being tested from reaching and contaminating the photoluminescent analyte-sensitive probe 70 through the annular interface between the inner wall (not separately numbered) of the needle 20 and the outer wall (not separately numbered) of the fiber optic filament 50.

The photoluminescent analyte-sensitive probe 70 is nonadherently entrapped within the lumen 29 between the distal tip 51 of the at least one fiber optic filament 50 and the distal tip 21 of the needle 20, and has unimpeded fluid communication with the external environment through the at least one port 28 in the needle 20.

Figure 3:
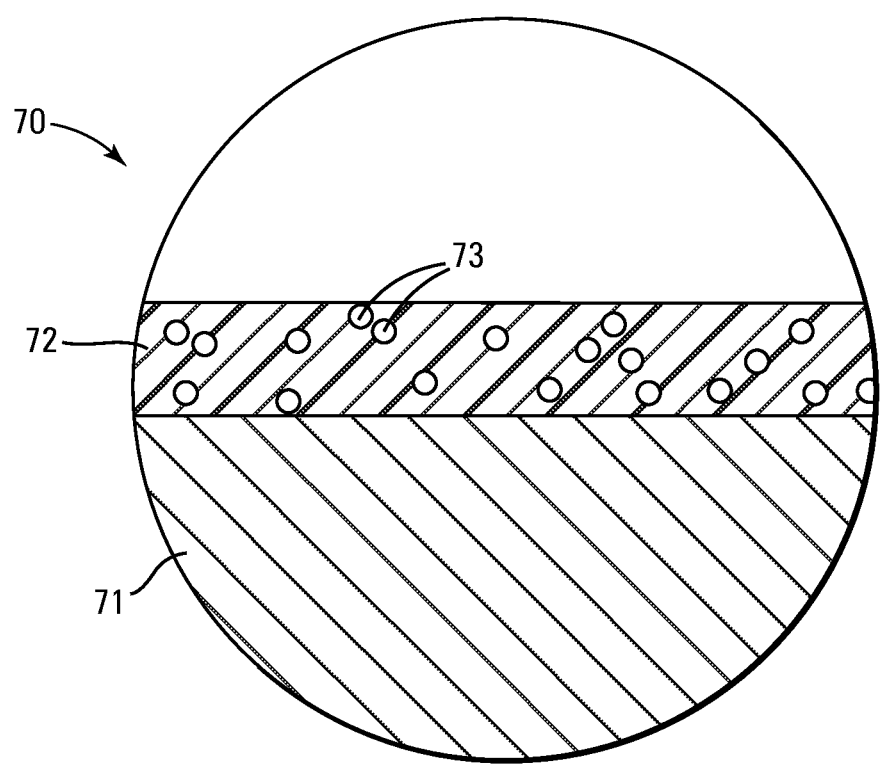
FIG. 3 is a grossly enlarged cross-section of a portion of the probe component of the invention depicted in FIG. 1.
Figure 4A:
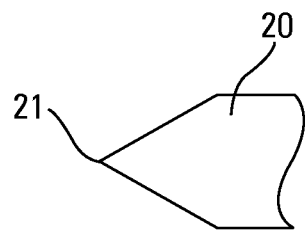
FIG. 4A is an enlarged side view of one embodiment of the tip portion of a sharp-tipped needle according to the present invention.
Figure 4B:
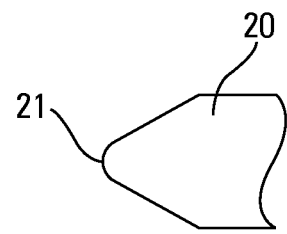
FIG. 4B is an enlarged side view of one embodiment of the tip portion of a blunt-tipped needle according to the present invention.

Referring to FIG. 3, the probe 70 includes a carrier substrate 71 coated with an analyte-sensitive photoluminescent dye 73. The analyte-sensitive photoluminescent dye 73 is preferably embedded within an analyte-permeable polymer matrix 72.

The carrier substrate 71 may be selected from any material possessing sufficient structural integrity to physically support the analyte-sensitive photoluminescent dye 73 and capable of withstanding extended exposure to the environment into which the probe 70 is to be used (e.g., high humidity, low humidity, submerged in water, submerged in an acidic solution, etc). Materials suitable for use as the carrier substrate 71, dependent of course upon the environment into which the probe 10 is to be used, include specifically but not exclusively, cellulosics such as paper, wax paper, cardstock, cardboard, wood and wood laminates; plastics such polyethylene, polypropylene and polyethylene terephthalate; metals such as aluminum sheets, aluminum foil, steel and tin; woven and unwoven fabrics; glass; and various combinations and composites thereof such a mylar. A preferred carrier substrate 71 is nonwoven glass fiber fabric. Without intending to be unduly limited thereby, it is believed that the compounded photoluminescent dye 73 and analyte-permeable polymer matrix 72 penetrate into the interstitial void volume of the glass fiber carrier substrate 71 and coat the individual fibrils (not shown) of the carrier substrate 71. Suitable glass fiber filter discs are widely available from a number of sources including specifically, but not exclusively, Millipore Corporation of Bedford, Mass. under the designations (APFA, APFB, APFC, APFD, APFF and AP40 for binder-free filters and AP15, AP20 AP25 for binder-containing filters), Zefon International, Inc. of Oscala, Fla. (IW-AH2100, IW-A2100, IW-AE2100, IW-B2100, IW-C2100, IW-D2100, IW-E2100 and IW-F2100 for binder-free filters) and Pall Corporation of Port Washington, N.Y. (A/B, A/C A/D and A/E for binder-free filters and Metrigard™ for binder-containing filters). The glass fiber carrier substrate 71 preferably has a thickness of between 100 μm and 5,000 μm, most preferably between 200 μm and 2,000 μm.

The analyte-sensitive photoluminescent dye 73 may be selected from any of the well-known analyte-sensitive photoluminescent dyes 73. One of routine skill in the art is capable of selecting a suitable dye 73 based upon the intended use of the fiber optic analyte-sensing needle 10. For example, a nonexhaustive list of suitable oxygen-sensitive photoluminescent dyes 73 includes specifically, but not exclusively, ruthenium(II)-bipyridyl and ruthenium(II)-diphenylphenanothroline complexes, porphyrin-ketones such as platinum(II)-octaethylporphine-ketone, platinum(II)-porphyrin such as platinum(II)-tetrakis(pentafluorophenyl)porphine, palladium(II)-porphyrin such as palladium(II)-tetrakis(pentafluorophenyl)porphine, phosphorescent metallocomplexes of tetrabenzoporphyrins, chlorins, azaporphyrins, and long-decay luminescent complexes of iridium(III) or osmium(II).

Typically, the analyte-sensitive photoluminescent dye 73 is compounded with a suitable analyte-permeable polymer matrix 72. Again, one of routine skill in the art is capable of selecting a suitable analyte-permeable polymer matrix 72 based upon the intended use of the fiber optic analyte-sensing needle 10. For example, a nonexhaustive list of suitable polymers for use as an oxygen-permeable polymer matrix 72 includes specifically, but not exclusively, polystryrene, polycarbonate, polysulfone, polyvinyl chloride and some co-polymers.

Manufacture

The photoluminescent analyte-sensitive probe 70 can be manufactured by the traditional methods employed for manufacturing such elements. Briefly, the probe 70 can be conveniently manufactured by (A) preparing a coating cocktail (not shown) which contains the photoluminescent analyte-sensitive dye 73 and the analyte-permeable polymer matrix 72 in an organic solvent (not shown) such as ethylacetate, (B) applying the cocktail to at least one major surface (unnumbered) of a carrier substrate 71, such as by dunking the carrier substrate 71 in the cocktail (not shown), and (C) allowing the cocktail (not shown) to dry, whereby a solid-state, thin film coating is formed on the carrier substrate 71 to form the probe 70.

Generally, the concentration of the polymer matrix 72 in the organic solvent (not shown) should be in the range of 0.1 to 20% w/w, with the ratio of dye 73 to polymer matrix 72 in the range of 1:20 to 1:10,000 w/w, preferably 1:50 to 1:5,000 w/w.

The fiber optic analyte sensing needle 10 can be assembled by (a) attaching the needle 20 to a collar 30 with a suitable fitting 40 such as a Luer-Lok fitting, (b) obtaining a probe 70 small enough to fit within the lumen 29 of the needle 20 but large enough not to fall out through a port 28 in the needle 20, (c) inserting the probe 70 into the open end (not separately numbered) of the collar 30 and tamping the probe 70 into the lumen 29 of the needle 20 until it is positioned proximate the distal tip 21 of the needle 20, (d) coating a distal end portion of the at least one fiber optic filament 50, excluding the distal tip 51, with uncured sealant 60, (e) threading the coated distal end portion of the fiber optic filament 50 through the collar 30 and into the lumen 29 of the needle 20 until the distal tip 51 of the coated fiber optic filament 50 is positioned proximate the probe 70, and (f) allowing the sealant 60 to cure.

The proximal end (not shown) of the fiber optic filament 50 can then be connected to the necessary electronics.

Use

The fiber optic analyte sensing needle 10 can be used to quickly, easily, accurately and reliably measure analyte concentration within a defined space, typically an enclosed spaced, (not shown). Briefly, the fiber optic analyte sensing needle 10 can be used to measure analyte concentration within a defined space (not shown) by (A) placing the distal end portion of the needle 20 into fluid communication with a defined space to be tested (not shown), such as by placing the distal end portion of the needle 20 proximate the sealing mechanism (not shown) of a modified atmosphere packaging form, fill and seal machine (not shown), or sealingly penetrating a hermetically sealed package (not shown) with the distal end portion of the needle 20, and (B) ascertaining the analyte concentration within the defined space (not shown) by (i) repeatedly exposing the probe 70 to excitation radiation transmitted down the at least one fiber optic filament 50 over time, (ii) measuring radiation emitted by the excited probe 70 and transmitted up the at least one fiber optic filament 50 after at least some of the exposures, (iii) measuring passage of time during the repeated excitation exposures and emission measurements, and (iv) converting at least some of the measured emissions to an analyte concentration based upon a known conversion algorithm. Such conversion algorithms are well know to and readily developable by those with routine skill in the art.

In a similar fashion, the fiber optic analyte sensing needle 10 can be used to quickly, easily, accurately and reliably monitor changes in analyte concentration within a defined space, typically an enclosed spaced, (not shown). Briefly, the fiber optic analyte sensing needle 10 can be used to measure analyte concentration within a defined space (not shown) by (A) placing the distal end portion of the needle 20 into fluid communication with a defined space to be tested (not shown), such as by placing the distal end portion of the needle 20 proximate the sealing mechanism (not shown) of a modified atmosphere packaging form, fill and seal machine (not shown), or sealingly penetrating a heremtically sealed package (not shown) with the distal end portion of the needle 20, (B) ascertaining the analyte concentration within the defined space (not shown) by (i) repeatedly exposing the probe 70 to excitation radiation transmitted down the at least one fiber optic filament 50 over time, (ii) measuring radiation emitted by the excited probe 70 and transmitted up the at least one fiber optic filament 50 after at least some of the exposures, (iii) measuring passage of time during the repeated excitation exposures and emission measurements, and (iv) converting at least some of the measured emissions to an analyte concentration based upon a known conversion algorithm, and (C) reporting at least one of (i) at least two ascertained analyte concentrations and the time interval between those reported concentrations, and (ii) a rate of change in analyte concentration within the defined space calculated from data obtained in step (B). Conversion algorithms used to convert the measured emissions to an analyte concentration are well know to and readily developable by those with routine skill in the art.

The radiation emitted by the excited probe 70 can be measured in terms of intensity and/or lifetime (rate of decay, phase shift or anisotropy), with measurement of lifetime generally preferred as a more accurate and reliable measurement technique when seeking to establish analyte concentration via measurement of the extent to which the dye 21 has been quenched by the analyte.

I claim:

1. A fiber optic analyte sensing needle, comprising:
   (a) a hollow distal tipped needle having a longitudinal lumen with at least one lateral side port proximate the distal tip,
   (b) at least one fiber optic filament having a distal end portion sealingly jacketed within the lumen, and
   (c) a photoluminescent analyte-sensitive probe nonadherently entrapped within the lumen between a distal tip of the at least one fiber optic filament and the distal tip of the needle, the photoluminescent analyte-sensitive probe comprising a glass fiber carrier substrate coated with a homogeneous matrix of an analyte-sensitive photoluminescent dye and an analyte-permeable hydrophobic polymer,
   (d) wherein the probe is in unimpeded fluid communication with an external environment through the at least one lateral side port in the needle sans any intervening element between the probe and the at least one lateral side port.

2. The fiber optic analyte sensing needle of claim 1 wherein the needle is a sharp-tipped needle.

3. The fiber optic analyte sensing needle of claim 1 wherein the needle is a blunt-tipped needle.

4. The fiber optic analyte sensing needle of claim 1 wherein the analyte-sensitive photoluminescent dye is an oxygen-sensitive photoluminescent dye.

5. The fiber optic analyte sensing needle of claim 4 wherein the oxygen-sensitive photoluminescent dye is an oxygen-sensitive transition metal complex.

\* \* \* \* \*